US012809546B2

(12) United States Patent
Muthiah et al.

(10) Patent No.: US 12,809,546 B2
(45) Date of Patent: Nov. 24, 2026

(54) COMPUTATIONAL STORAGE DEVICE WITH COMPUTATION PRECISION-DEFINED FIXED POINT DATA GROUPING AND STORAGE MANAGEMENT

(71) Applicant: Western Digital Technologies, Inc., San Jose, CA (US)

(72) Inventors: Ramanathan Muthiah, Bangalore (IN); Daniel Joseph Linnen, Limestone (TN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 557 days.

(21) Appl. No.: 18/230,576

(22) Filed: Aug. 4, 2023

(65) Prior Publication Data

US 2025/0004661 A1 Jan. 2, 2025

Related U.S. Application Data

(60) Provisional application No. 63/523,444, filed on Jun. 27, 2023.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0664; G06F 2212/7202; G06F 12/0246; G06F 3/064

(Continued)

(56) References Cited

U.S. PATENT DOCUMENTS 5,774,133 A * 6/1998 Neave .................... G06T 17/00 345/503
8,805,651 B1 * 8/2014 Bartlett .................. G06F 30/20 703/2

(Continued)

FOREIGN PATENT DOCUMENTS

CN 114461176 A * 5/2022
EP 3812883 A1 * 4/2021 .............. G06F 1/16

OTHER PUBLICATIONS

Ponti, Moacir et al., "Compact Color Features with Bitwise Quantization and Reduced Resolution for Mobile Processing", 2013 IEEE Global Conference on Signal and Information Processing; Dec. 3-5, 2013; https://ieeexplore.ieee.org/document/6737000; 4 pages.

(Continued)

*Primary Examiner* — Hua J Song
(74) *Attorney, Agent, or Firm* — LOZA & LOZA, LLP; Gabriel Fitch

(57) ABSTRACT

A computational storage device (CSD) is provided with a processor that obtains fixed point data having an initial precision (e.g., 32 bits per word) and determines a computation precision requirement for the fixed point data (such as a requirement for regular precision processing as opposed to low precision processing). The processor separates the fixed point data, based on the computational precision requirement, into a first group of bits, e.g., the most significant bits, and a second group of bits, e.g., the least significant bits, then separately stores the first the second groups of bits in the NVM array so that the different groups of bits can be fetched and managed separately. In this manner, bitwise grouping of fixed point data may be exploited to facilitate low precision processing when it is sufficient, while also (Continued)

accommodating full or regular precision processing when needed. Various methods are also described.

28 Claims, 9 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 10,847,075 | B1 * | 11/2020 | Buckley | G09G 3/2044 |
| 11,195,580 | B2 | 12/2021 | Jaiswal et al. | |
| 11,445,157 | B2 | 9/2022 | Luo et al. | |
| 11,520,521 | B2 | 12/2022 | Bazarsky et al. | |
| 11,568,609 | B1 | 1/2023 | Liu et al. | |
| 11,875,043 | B1 * | 1/2024 | Zainuddin | G06F 3/0653 |
| 12,159,062 | B2 * | 12/2024 | Frolikov | G06F 3/0659 |
| 2015/0015590 | A1 * | 1/2015 | Jeong | G09G 3/2003<br>345/502 |
| 2017/0270073 | A1 * | 9/2017 | Badin | G06N 3/063 |
| 2020/0117520 | A1 * | 4/2020 | Costa | G06F 3/0604 |
| 2021/0034979 | A1 * | 2/2021 | Robinson | G06N 3/08 |
| 2022/0043586 | A1 * | 2/2022 | Liang | G06F 3/0625 |
| 2022/0114402 | A1 * | 4/2022 | Toshchakov | G06F 18/2431 |
| 2022/0261634 | A1 * | 8/2022 | Liu | G06N 3/045 |
| 2022/0293198 | A1 * | 9/2022 | Sakakibara | G11C 16/24 |
| 2023/0015496 | A1 * | 1/2023 | Oh | G06F 3/0679 |
| 2024/0004952 | A1 * | 1/2024 | Huang | G06N 3/084 |
| 2024/0005135 | A1 * | 1/2024 | Abuhatzera | G06N 3/063 |

OTHER PUBLICATIONS

Brookes, Tim, “What Is Dynamic Resolution Scaling (DRS)?”, How-To Geek; Nov. 14, 2021; https://www.howtogeek.com/764408/what-is-dynamic-resolution-scaling-drs/; 5 pages. (Website).

* cited by examiner

COMPUTATIONAL STORAGE DEVICE WITH COMPUTATION PRECISION-DEFINED FIXED POINT DATA GROUPING AND STORAGE MANAGEMENT

CROSS REFERENCE TO RELATED APPLICATIONS

This application claims priority to and the benefit of U.S. Provisional Application No. 63/523,444, entitled "COMPUTATIONAL STORAGE DEVICE WITH COMPUTATION PRECISION-DEFINED FIXED POINT DATA GROUPING AND STORAGE MANAGEMENT," filed Jun. 27, 2023, the entire content of which is incorporated herein by reference as if fully set forth below in its entirety and for all applicable purposes.

FIELD

The disclosure relates, in some aspects, to computational storage devices (CSD) such as CSDs equipped with non-volatile memory (NVM) arrays. More specifically, but not exclusively, the disclosure relates to CSDs with fixed point data in-built accelerators.

Introduction

A computational storage device (CSD), which may also be referred to as a compute storage device, is a type of information technology architecture in which data may be processed at the storage device level. For example, digital signal processing (DSP) may be performed by computational processing cores within the CSD. This may be done, for example, to reduce the amount of data transferred between a storage device that stores the data and a host computer and can be particularly useful in systems requiring massive amounts of computation.

With CSDs, computations can be moved from the host to CSDs that have in-built accelerators or other computational cores, such as cores formed in a System-on-a-Chip (SoC). Fixed point data processing is a common format for audio/video/image processing in a DSP, such as processing for object detection within images, voice verification, or searches in audio processing. Such DSP functions often need substantial processing capabilities as well as dynamic data management to manage various different functions that require different amounts of power, performance, and/or latency, or require different levels of processing precision. For example, different forms of media may require different levels of processing precision.

It would be advantageous to provide improvements within CSDs or other devices so that the device can perform data storage management in a manner consistent with media processing precision capabilities of the device and consistent with any requirements of the computational data. Aspects of the present disclosure are directed to these and other ends.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a device that includes: a non-volatile memory (NVM) array; and a processor configured to: obtain fixed point data having an initial precision; determine a computational precision requirement for the fixed point data; separate the fixed point data, based on the computational precision requirement, into a first group of bits and a second group of bits, wherein the first group of bits represents the fixed point data with less precision than the initial precision, and wherein the first and second groups of bits together represent the fixed point data with the initial precision; and separately store the first and second groups of bits in the NVM array.

Another embodiment of the disclosure provides a method for use with a device comprising a processor and an NVM array. The method includes: obtaining fixed point data having an initial precision; determining a computational precision requirement for the fixed point data; separating the fixed point data, based on the computational precision requirement, into a first group of bits and a second group of bits, wherein the first group of bits represents the fixed point data with less precision than the initial precision, and wherein the first and second groups of bits together represent the fixed point data with the initial precision; and separately storing the first and second groups of bits in the NVM array.

Yet another embodiment of the disclosure provides an apparatus for use with an NVM array. The apparatus includes: means for obtaining fixed point data having an initial precision; means for determining a computational precision requirement for the fixed point data: means for separating the fixed point data, based on the computational precision requirement, into a first group of bits and a second group of bits, wherein the first group of bits represents the fixed point data with less precision than the initial precision, and wherein the first and second groups of bits together represent the fixed point data with the initial precision; and means for separately storing the first group of bits and the second group of bits in the NVM array.

DETAILED DESCRIPTION

Figure 1:
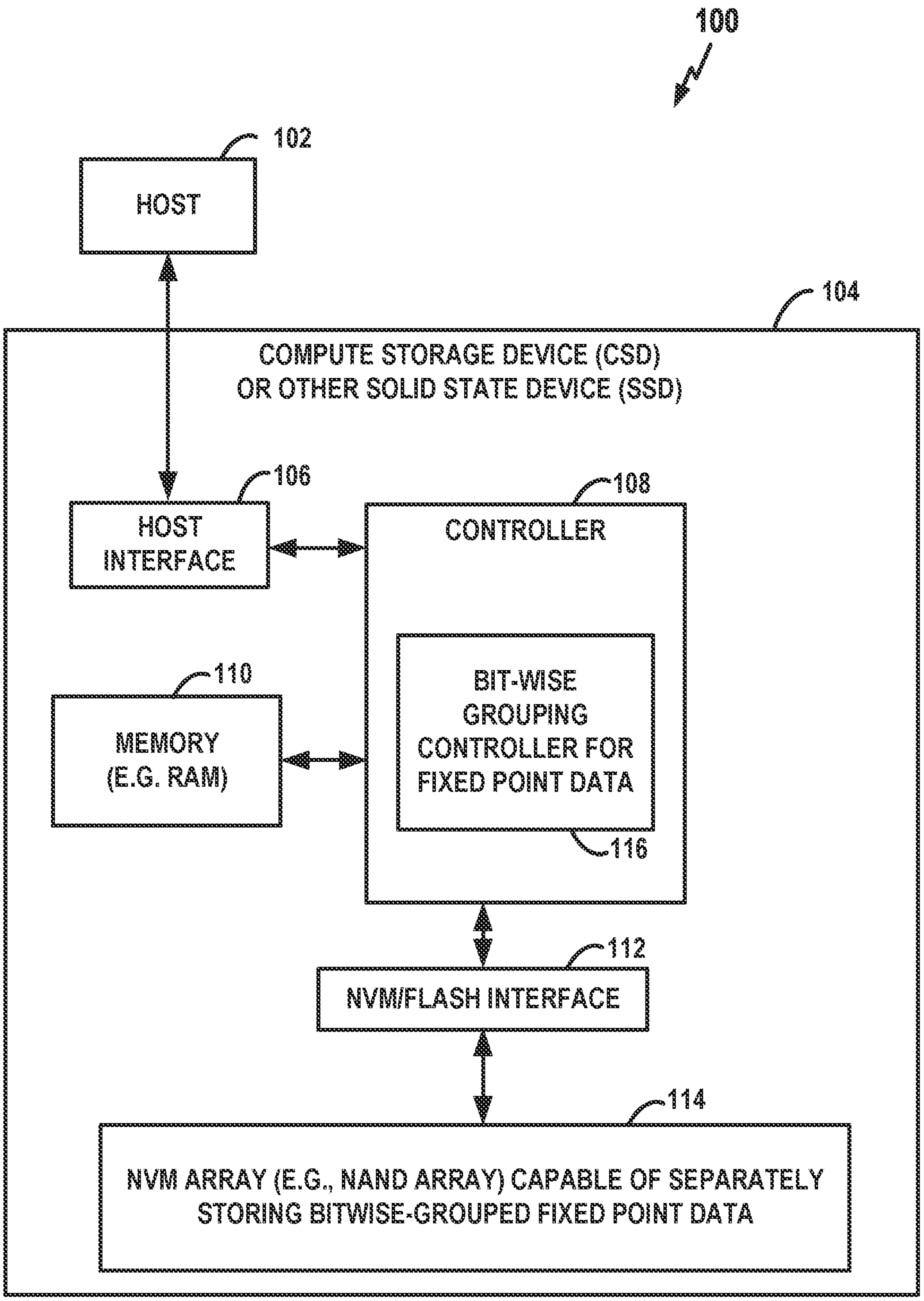
FIG. 1 is a schematic block diagram configuration of an exemplary computation storage device (CSD) having a non-volatile memory (NVM) array, where the CSD has components for the separate bitwise grouping and storage of fixed point data, according to aspects of the present disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a computation storage device (CSD) or other data storage device (DSD), such as a solid state device (SSD), and in particular to NAND flash memory storage devices (herein "NANDs"). (A NAND is a type of non-volatile storage technology that does not require power to retain data. It exploits negative-AND, i.e., NAND, logic.) For the sake of brevity, an CSD having one or more NAND dies will be used below in the description of various embodiments. It is understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays. Such memory devices may be accessible to a processing component such as a Central Processing Unit (CPU) or a Graphical Processing Unit (GPU), which may include one or more computing cores and/or accelerators.

Overview

As noted above, CSDs may have in-built accelerators or other computational cores, such as cores formed on a System-on-a-Chip (SoC), that perform fixed point data processing for digital signal processing (DSP) or other purposes. DSP functions often need substantial processing capabilities, along with dynamic data management to manage various different functions that require different amounts of power, performance, and/or latency, or require different levels of processing precision. Different forms of media (e.g., video vs. audio) may require different amounts of processing precision, e.g., regular precision vs. low precision.

Herein, methods and apparatus are disclosed for use with CSDs or other storage devices that include a processor or other controller configured to: obtain (e.g., receive) fixed point data having an initial precision (e.g., 32 bits per word); determine a computation precision requirement for the fixed point data (such as a requirement for regular precision processing as opposed to low precision processing); separate the fixed point data, based on the computational precision requirement, into a first group of bits, e.g., a most significant bit (MSB) portion, and a second group of bits, e.g., a least significant bit (LSB) portion, wherein the first group of bits represents the fixed point data with less precision that the initial precision (e.g., just MSB), and wherein the first and second groups of bits together represent the fixed point data with the initial precision (e.g. MSB+LSB); and separately store the first the second groups of bits in the NVM array so that the different groups of bits can be managed separately. In this manner, bitwise grouping of fixed point data may be exploited to facilitate low precision processing when it is sufficient, while also accommodating full or regular precision processing when needed.

In one example, MSB portions and LSB portions of the fixed point data can be stored as separate NAND fragments in an NVM (e.g., NAND) array so that when low precision processing is sufficient, the MSB portion only is retrieved from the NVM array and processed, thus saving bandwidth and other resources. If regular (e.g., standard) precision processing is needed, both the MSB and LSB portions of the data are retrieved from the NVM array. The fixed point data may be, for example, video/audio/image data or computation kernel weights, etc. Note that the portion of the data comprising just the lower resolution bits, e.g., just the MSB, may be regarded as a degraded version of the data or a scaled version of the data. Note also that MSB vs. LSB approach described in this paragraph represents just one example of bitwise grouping that is merely illustrative. In other examples, the bits of the fixed point data may be grouped into three or more groups each representing different levels of precision. For example, either the first group of bits or the second group of bits can be further separated into two or more additional groups, which, in turn, can be separated into still further groups. Generally speaking, the fixed point data can be separated into N groups. In some examples, a full precision version of the data is stored along with one or more degraded versions.

In one embodiment, a computational or compute core (e.g., an accelerator core) formed on a SoC of a CSD performs the bitwise grouping of computational weights and/or data samples for flash storage based on the precision requirements of a specialized (i.e., "in-house") computation that the core performs on the fixed point data. In some examples, a flash translation layer (FTL) controller of the CSD performs or controls the bitwise grouping. For example, the FTL controller groups a set of significant bits of each of the data samples of a video/audio/image or kernel weight (with the number of bits in each group decided by the controller) into flash fragments and manages the fragments accordingly through a bit grouping module. In some examples, the FTL controller includes a decision module to determine whether to perform regular or low precision computations.

These and other embodiments provide flexibility so that the storage controller of the CSD can store a set of copies of the fixed point data, each with a specific resolution. The decision on the number of copies to store can be based on the processing requirements (e.g., the requirements of compute cores or the requirements imposed by a host that the CSD is coupled to). In this manner, the CSD can perform the bit grouping once, proactively, and then service multiple requests for data at multiple, different resolutions on a dynamic basis.

In some examples, the procedure employed to create the multiple resolution bit-grouped copies can be executed by the storage controller of the CSD or by on-chip circuitry in the NVM array, e.g., using “under-the-array” circuits in a CMOS direct bonded (CBA) NAND chip or die that can perform computations in the memory chip itself rather than transferring the data to the storage controller (wherein CMOS refers to a complementary metal-oxide-semiconductor). The grouping operations may be controlled based on workload, e.g., based on power usage or throughput thresholds/requirements, etc.

In some aspects, the fixed point data may be ordinarily stored with full resolution (“top resolution”) but then the device performs resolution degradation during idle time/garbage collection (ITGC). i.e., during a state when the device has resources available to perform any activity not related to the host. The device may manage one or more degraded resolution copies, either temporarily or permanently, based on one or more use cases. The decision to perform data degradation (i.e., data resolution scaling) can be dynamic and can be triggered at any point in time, as an example during storage idle time.

In yet another embodiment, rather than separating MSB from LSB bits, image data can be separated into full color vs. grayscale. For example, the red-green-blue (RB) components of an image can be modified using G=rgb2gray (RGB), which converts the true color image RGB to the grayscale image G, so that G can be stored separately from an RGB representation. An advantage of this procedure is that when a compute core requires only a grayscale image, the device need not fetch the RGB image (which has a larger size) and then perform a conversion to grayscale every time the data needs to be processed. In this manner, the usage of power, performance, and resources can be optimized or at least improved.

In embodiments where the FTL controls the procedure, FTL storage biasing for MSB fragments may be enabled. For example, the FTL controller can protect MSB fragments through stronger parity schemes as compared to LSB fragments. In another implementation, the FTL controller can store bit-grouped data as a temporary copy rather than modifying a primary copy. Bitwise grouping of data can be implemented in various manners such as, for example, masking certain bits from certain data sets and/or providing appropriate padding prior to storage. The FTL controller can also route or manage streams for MSB fragments differently compared to LSB fragments based on access requirements. For example, the FTL controller can allocate high endurance physical blocks for MSB fragments upon determining those blocks are accessed frequently. Similarly, the FTL controller may allocate low endurance physical blocks for LSB fragments since their retrieval and flush periodicity would be much lower than the MSB fragments. Other factors such as “time to live” parameters can also be controlled or adjusted to bias the MSB and LSB fragments. In yet another embodiment, the FTL controller can also perform the bit level data grouping and subsequent storage if the FTL controller is instructed by the host system, e.g., via a vendor command or similar notification, that the data will be accessed based on certain computational precision requirements at the host side.

Thus, various embodiments are described herein. In one general aspect, a compute core performs bitwise grouping of fixed point data upon determining that it or another core should access the data in a low precision mode. In another general aspect, the FTL controller performs the grouping of host data if the FTL controller determines that a compute core is to access the data for a defined precision level. In a third general aspect, the FTL controller performs grouping as requested by a host system based on host-side precision requirements. The FTL controller may bias various legacy policies related to data protection, block endurance, and block routing to optimize or otherwise control the system.

Note that although the examples herein primarily involve devices that store data in NVM, at least some aspects are also applicable to devices that store the data in volatile memory.

Exemplary SSD/CSD Implementation of Bit-Wise Grouping of Fixed Point Data

FIG. 1 is a block diagram of a system 100 including an exemplary CSD (or other SSD) having components for bitwise grouping of fixed point data in accordance with aspects of the disclosure. (Although a CSD with NVM is used as an illustrative example, at least some aspects of the disclosure are applicable to hard disk drive (HDD) systems and other data storage devices (DSDs)). The system 100 includes a host 102 and an CSD 104 coupled to the host 102. The host 102 provides commands to the CSD 104 for transferring data between the host 102 and the CSD 104. For example, the host 102 may provide a write command to the CSD 104 for writing data (including fixed point data such as media data) to the CSD 104 or read command to the CSD 104 for reading data (including the fixed point data) from the CSD 104. The host 102 may be any system or device having a need for data storage or retrieval and a compatible interface for communicating with the CSD 104. For example, the host 102 may be a computing device, a personal computer, a portable computer, a workstation, a server, a personal digital assistant, a digital camera, or a digital phone as merely a few examples. Additionally or alternatively, the host 102 may be a system or device having a need for neural network processing, such as speech recognition, computer vision, and self-driving vehicles. For example, the host 102 may be a component of a self-driving system of a vehicle.

The CSD 104 includes a host interface 106, a controller 108, a memory 110 (such as a random access memory (RAM)), an NVM interface 112 (which may be referred to as a flash interface), and an NVM 114, such as one or more NAND dies, including one or more CBA dies. The NVM 114 may be configured to be capable of separately storing bit-wise grouped fixed point data, e.g., within different NAND blocks. The host interface 106 is coupled to the controller 108 and facilitates communication between the host 102 and the controller 108. The controller 108 is coupled to the memory 110 as well as to the NVM 114 via the NVM interface 112. The host interface 106 may be any suitable communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, a Peripheral Component Interconnect Express (PCIe) interface, an NVM express (NVMe) interface, or the like. In some embodiments, the host 102 includes the CSD 104. In other embodiments, the CSD 104 is remote from the host 102 or is contained in a remote computing system communicatively coupled with the host 102. For example, the host 102 may communicate with the CSD 104 through a wireless communication link. The CSD 104 may be an Edge device configured for Edge computing and/or the CSD 104 may be a component of a distributed resource system (DRS).

The controller 108 controls operation of the CSD 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110. The memory 110 may be referred to as a working memory.

The controller 108 may include any type of processing device, such as a microprocessor, a microcontroller, an embedded controller, a logic circuit, software, firmware, or the like, for controlling operation of the CSD 104, including one or more compute cores and/or accelerators (not shown in FIG. 1). In some aspects, some or all of the functions described herein as being performed by the controller 108 may instead be performed by another element of the CSD 104. For example, the CSD 104 may include another microprocessor, microcontroller, embedded controller, logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, one or more of the functions described herein as being performed by the controller 108 may instead be performed by another element such as a controller in a hybrid drive including both non-volatile memory elements and magnetic storage elements. Still further, and as will be explained below, one or more of the functions described herein may be performed by circuitry within the NVM array 114.

The memory 110 may be any suitable memory, computing device, or system capable of storing data. For example, the memory 110 may be ordinary RAM, DRAM, double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory. The NVM 114 receives data from the controller 108 via the NVM interface 112 and stores the data. The NVM 114 may be any suitable type of non-volatile memory, such as a NAND-type flash memory or the like.

In the example of FIG. 1, the controller 108 may include hardware, firmware, software, or any combinations thereof that provide a bit-wise grouping controller 116 for fixed point data. The bit-wise grouping controller 116 may be configured to: obtain fixed point data to be processed (e.g., from the host 102); determine a computational precision requirement for the fixed point data (e.g., regular precision processing vs. low precision processing); separate the fixed point data, based on the computational precision requirement, into a first group of bits and a second group of bits; and separately store the first group of bits and the second group of bits in the NVM array 114. In some examples, the bit-wise grouping controller 116 may be a component of an FTL (not shown in FIG. 1) or a component of computer core (also not shown in FIG. 1). In other examples, the bit-wise grouping controller 116 may be a component of the NVM array 114 or a component of the flash interface 112. In some aspects, the bit-wise grouping controller 116 may be composed of various different components, some of which are within the controller 108, the flash interface 112 and/or the NVM array 114. Furthermore, note that the component 116 is referred to herein as a bit-wise grouping controller since in many illustrative applications, the device performs bit-wise grouping, e.g., separate of MSB from LSB. It should be understood, however, that some of its functions do not necessarily require bit-wise grouping, per se. For example, separation of image data into grayscale vs. RGB components does not necessarily involve bit-wise grouping.

Although FIG. 1 shows an example CSD and a CSD is generally used as an illustrative example in the description throughout, the various disclosed embodiments are not necessarily limited to a CSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for deep learning that are described herein. The processor could, as one example, off-load certain tasks to the NVM array 114 and associated circuitry and/or components. As another example, the controller 108 may be a controller in another type of device and still include the bit-wise grouping controller 116 and perform some or all of the functions described herein.

Figure 2:
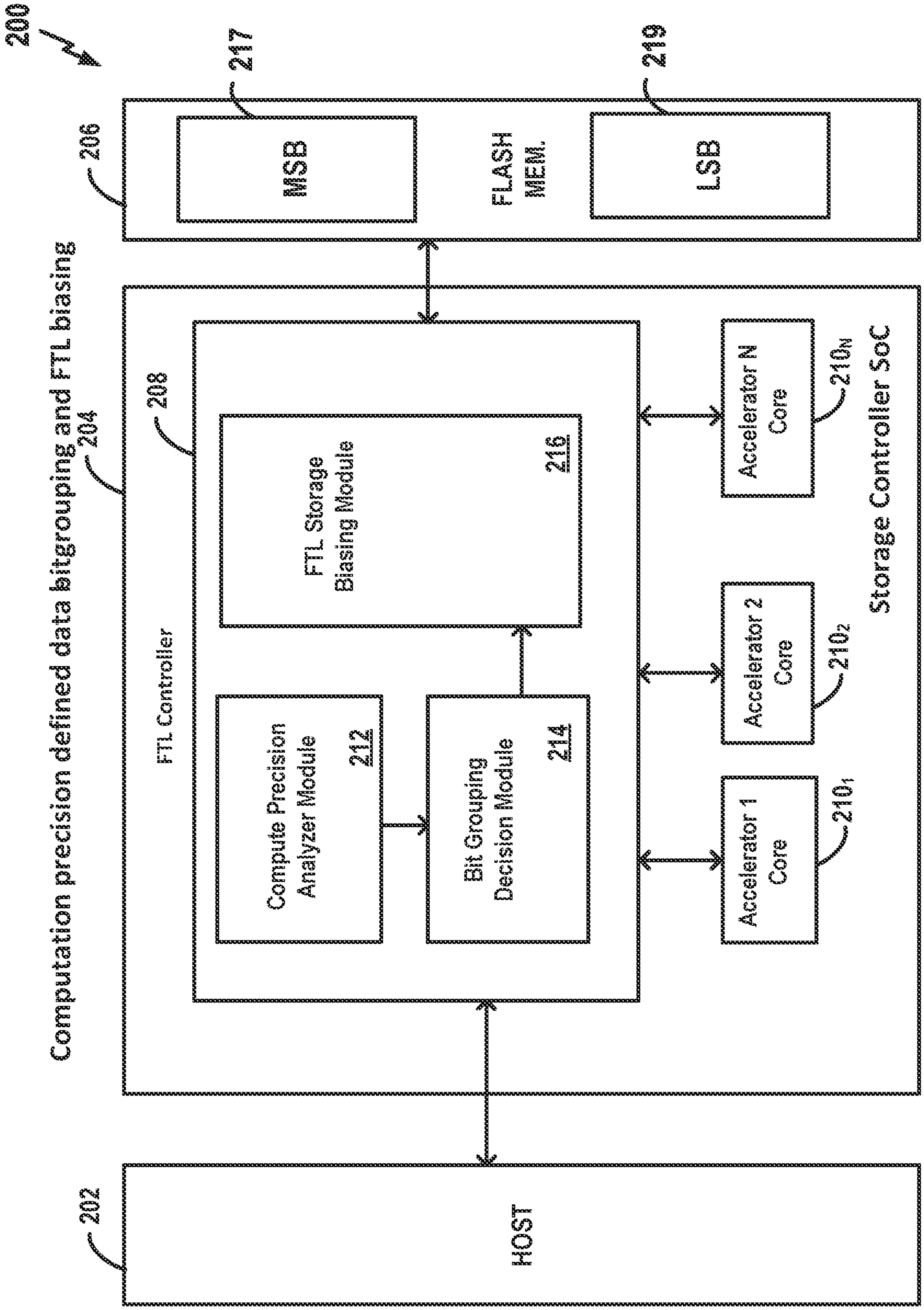
FIG. 2 is a schematic block diagram configuration of an exemplary CSD, where a flash translation layer (FTL) of the CSD has components for the separate bitwise grouping and storage of fixed point data, according to aspects of the present disclosure.

FIG. 2 is a block diagram illustrating an exemplary system 200 having a host 202, a storage controller SoC 204 of an CSD, and a flash memory (NVM array) 206, wherein the SoC 204 includes an FTL controller 208 and N compute accelerator cores $\mathbf{210}_{1 \ldots N}$, wherein the FTL controller 208 is configured to perform the bit-wise grouping of fixed point data or other data degradation functions such as grayscale conversion. For clarity, FIG. 2 omits other components of the SoC 204 and other components of the CSD of which the SoC 204 is just one component. In the example of FIG. 2, the FTL controller 208 includes a compute precision analyzer module 212, a bit grouping decision module 214, and an FTL storage biasing module 216. Note that the accelerator cores $\mathbf{210}_{1 \ldots N}$ are capable of parallel processing.

The compute precision analyzer module 212 is configured to determine a level of precision needed for computational operations performed by the cores $\mathbf{210}_{1 \ldots N}$, e.g., whether the operations need regular (full) precision data (e.g., MSB plus LSB) or just low (reduced) precision data (e.g., just the MSB). This may be determined, for example, based on commands or hints provided by the host 202 or based on the pre-programming of the cores (e.g., if the cores are performing "in house" computational procedures where the required precision is known in advance). In some examples, if the cores are configured to perform a set of different computational operations, a lookup table may be provided that lists the needed precision for each of the set of different computational operations.

The bit grouping decision module 214 then takes information generated by the compute precision analyzer module 212 and decides or determines whether data degradation is to be applied to the fixed point data being processed and, if so, how it should be applied. For example, the bit grouping decision module 214 may determine, based on the required computational precision, that only the eight most significant bits of each sixteen bit word of data is needed or, in another example, that only the four most significant bits of each sixteen bit word are needed. For an RGB/grayscale example, the bit grouping decision module 214 may determine that only grayscale pixels are needed. Lookup tables or the like may be provided that list the number of bits needed to meet a current precision requirement or whether grayscale vs. RGB is needed and, if RGB is needed, the color depth of the RGB pixels.

The FTL storage biasing module 216 then takes information from the bit grouping decision module 214 and controls the storage of the data in the flash memory by, for example, storing MSB data separately from LSB data (or, in some cases, storing MSB+LSB together). MSB data may be stored in MSB block 217; whereas LSB data may be stored in LSB block 219. Note that FTL biasing may include using different numbers of ECC parity bits to store MSB vs. LSB, or storing MSB in physical blocks that have greater endurance. In some examples, MSB data is stored in faster single level cells (SLC) of the flash memory 206, whereas LSB data is stored in slower multi-level cells (MLC) of the flash memory 206, such as tri-level cells (TLC) or quad-level cells (QLC). Then, during operation of the cores $210_{1 \ldots N}$, the FTL controller 208 provides the appropriate data to the cores 210 . . . N, e.g., by fetching and providing only MSB data for low precision processing or MSB+LSB data for regular (or full) precision processing. As an example, consider an audio sample comprising L and R stereo data where each component is a 32-bit fixed-point number which is 4 bytes, and hence 8 bytes for one stereo sample.

Figure 3:
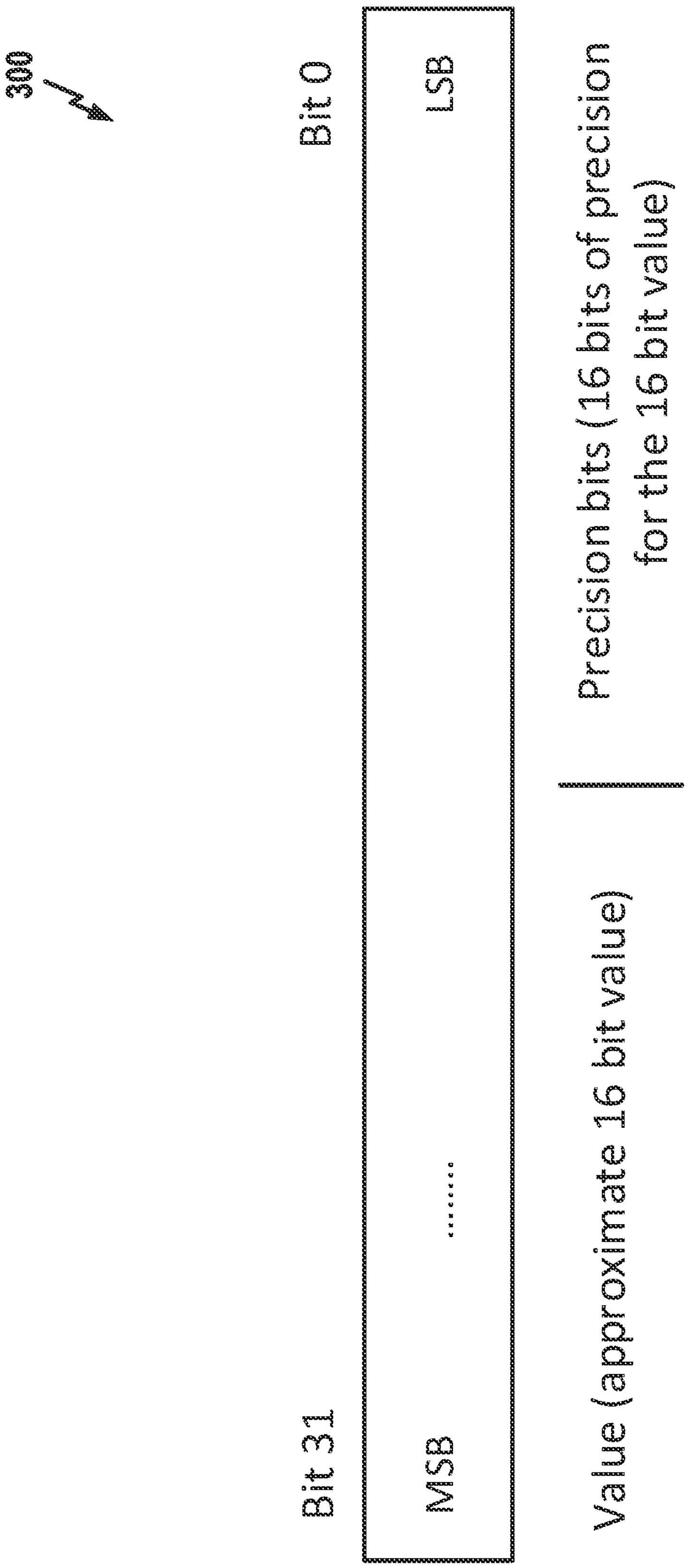
FIG. 3 is a block diagram representation of a fixed point data word having sixteen most significant bits (MSB) and sixteen least significant bits (LSB), which may be bitwise and separately stored according to aspects of the present disclosure.

FIG. 3 illustrates the 32 bit fixed point example 300. If a compute core 210 of FIG. 2 must store 64 kilo samples (65536) in the flash memory (via the FTL), a storage space of 512 KB would be needed. Write and retrieval latency applicable for 512 KB would apply as in an otherwise typical compute storage system. If the compute precision module 212 of FIG. 2 determines that the precision requirement to process that data is only 16 bit fixed point data, then the bit grouping module 214 would group the 16 bit MSB's of all the samples and store them as MSB fragments in the flash memory 206. Similarly, the bit grouping module 214 would store the 16 bit LSB's (e.g., LSB fragments, not required by compute cores for processing) as LSB fragments in the flash memory 206. Thus, when the data is retrieved or stored back, in this example, bandwidth is used only for half the data size, i.e., the most relevant bits. Other precision options can be enabled by grouping a different number of bits in the data. Although this particular example involves uncompressed audio stereo samples, the same procedure can be applied to image or video processing or other fixed point data.

The procedure thus enables an efficient low-latency and low-precision compute option in a CSD or other SSD. For example, the device can perform low-precision multiply-accumulate (MAC) computations when the application permits. In one image processing example, the compute cores of the CSD perform an object detection in an image. The application requirement may be to perform a high-level determination of the presence of a car in multiple images stored in the NVM array (flash memory). A low-precision and low-bandwidth detection (hence faster and power efficient) is sufficient in this example, as compared to a deeper level of detailing needed for other applications (for example, identifying a car's license plate). The CSD (and its accelerator cores) can thereby leverage this data management scheme to optimize storage and resources.

Figure 4:
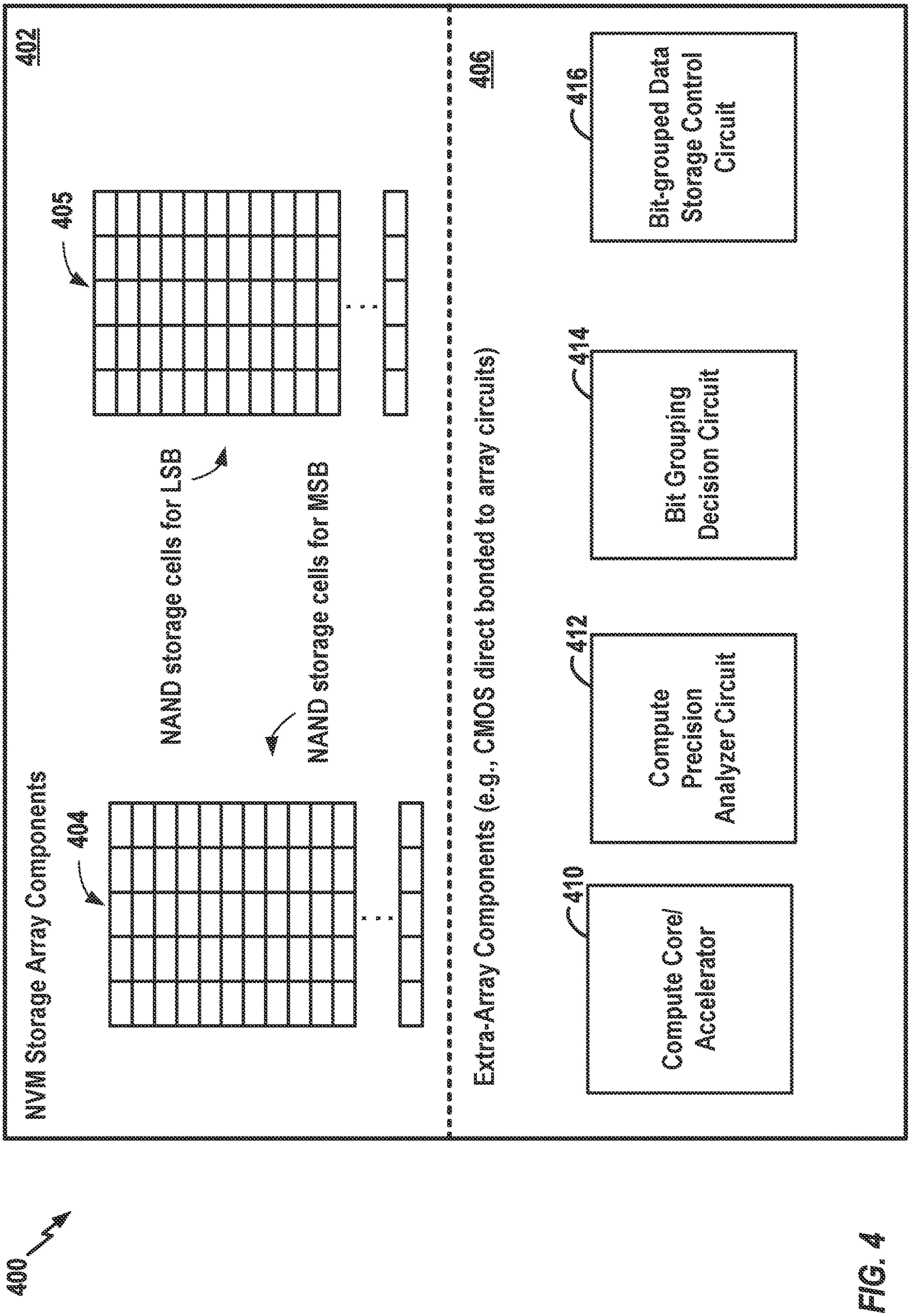
FIG. 4 is a schematic block diagram configuration of an exemplary die of an NVM array of a CSD that has components for the separate bitwise grouping and storage of fixed point data, according to aspects of the present disclosure.

FIG. 4 is a block diagram illustrating an exemplary NVM die 400 that includes NVM storage array components 402 that include NAND storage cells 404 for storing MSB values of fixed bit data and NAND storage cells 405 for storing LSB values of fixed bit data, where the cells may be arranged in word lines, blocks, planes, or the like. NVM die 400 also includes extra-array processing components 406, which are referred to herein as "extra-array" because they are not part of the array of NAND storage cells 404. The extra-array components 406 may be configured, for example, as under-the-array or next-to-the array circuit components. In one aspect, the die 400 is a CBA NAND chip.

In the example of FIG. 4, the exemplary processing components 406 include a compute core/accelerator 410 for performing on-chip computations, such as DSP, and a compute precision analyzer circuit 412 configured to determine a level of precision needed for computational operations performed by the cores 410, e.g., whether the operations need regular (full) precision data (e.g., MSB plus LSB) or just low (reduced) precision data (e.g., just the MSB). In some examples, the core 410 specifies the precision requirement or at least provides information sufficient to make the determination. A bit grouping decision circuit 414 takes information generated by the compute precision analyzer circuit 412 and decides or determines whether data degradation is to be applied to the fixed point data being processed. (Herein, degradation generally refers to generating a lower level of precision in data relative to an initial higher level of precision. The degradation need not be permanent since the data having the initial higher level of precision can be retained and used when needed.) A bit grouped storage control circuit 416 responds to the decision by performing bitwise grouping of MSB vs. LSB (or other functions) to generate degraded versions of fixed point data and stores the data in the NAND storage cells 404 or 405. The extra-array components 406 of FIG. 4 may operate similarly to corresponding components of FIG. 2.

Although not shown in FIG. 4, the die 400 may be coupled to a data storage controller, which in turn, may be coupled to a host, which provides the fixed point data for storage. In some examples, the compute core/accelerator is not formed on the die 400 but is a component of the data storage controller as in FIG. 2. If so, the extra-array components 406 of the die 400 may instead receive signals or commands from the data storage controller specifying the computational precision of the cores and/or specifying the bit grouping decision, so that the precision analyzer circuit 412 and/or bit grouping decision circuit 414 may be omitted from the extra-array components 406 of the die 400.

Figure 5:
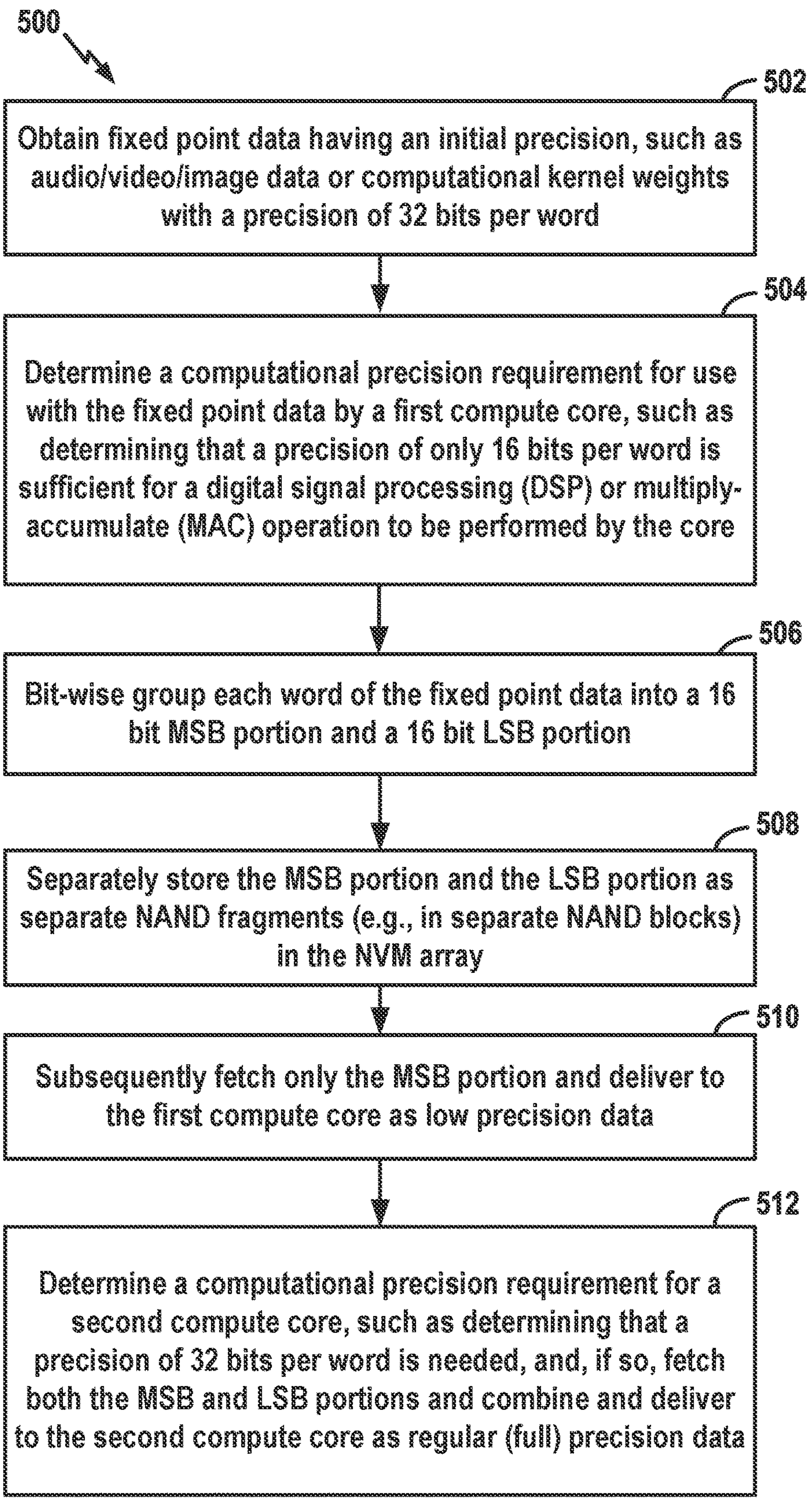
FIG. 5 is a flow chart of an exemplary method for the separate bitwise grouping and storage of fixed point data, according to aspects of the present disclosure.

FIG. 5 is a flow chart of an exemplary method according to aspects of the present disclosure for bitwise grouping of fixed point data based on computational precision requirements. Beginning at block 502, a processor or controller within a CSD or other SSD, such as the controller 116 of FIG. 1, obtains fixed point data having an initial precision, such as audio/video/image data or computational kernel weights with a precision of 32 bits per word. At block 504, the processor determines a computational precision requirement for use with the fixed point data by a first compute core, such as determining that a precision of only 16 bits per word is sufficient for a DSP or MAC operation to be performed by the first compute core. The MAC operations (or other compute core operations) may be, for example, used as part of a machine learning (ML) process, including ML training or ML inference procedures. At block 506, the processor performs a bit-wise grouping of each word of the fixed point data into a 16 bit MSB portion and a 16 bit LSB portion. At block 508, the processor separately stores the MSB portion and the LSB portion as separate NAND fragments (e.g., in separate NAND blocks) in the NVM array. At block 510, the processor subsequently fetches only the MSB portion and delivers it to the first compute core as low precision data to perform a computation that only requires low precision data. This may be done, e.g., when the compute core requests the data. In some examples, as already explained, the FTL controller may control the storage of the data in the NVM array and its fetching and retrieval (including using caches or the like).

At block 512, the processor may determine a computational precision requirement for a second compute core, such as determining that a precision of 32 bits per word is needed by that core, and, if so, the processor fetches both the MSB and LSB portions and combines the portions and delivers the combined data to the second compute core as regular (full) precision data. These procedures may be repeated for multiple cores and for multiple requests for data from those cores. In some cases, the computational precision requirements for a particular core may be dynamic and so data having different levels of precision (e.g., MSB or MSB+LSB) may be delivered to the core at different times. In other examples, a particular core might only need data of one level of precision (e.g., just MSB) for all of its computing operations. Note that if the data is audio data, resolution can be degraded or lowered in some examples by skipping some audio samples or reducing the samples per second of the data.

Figure 6:
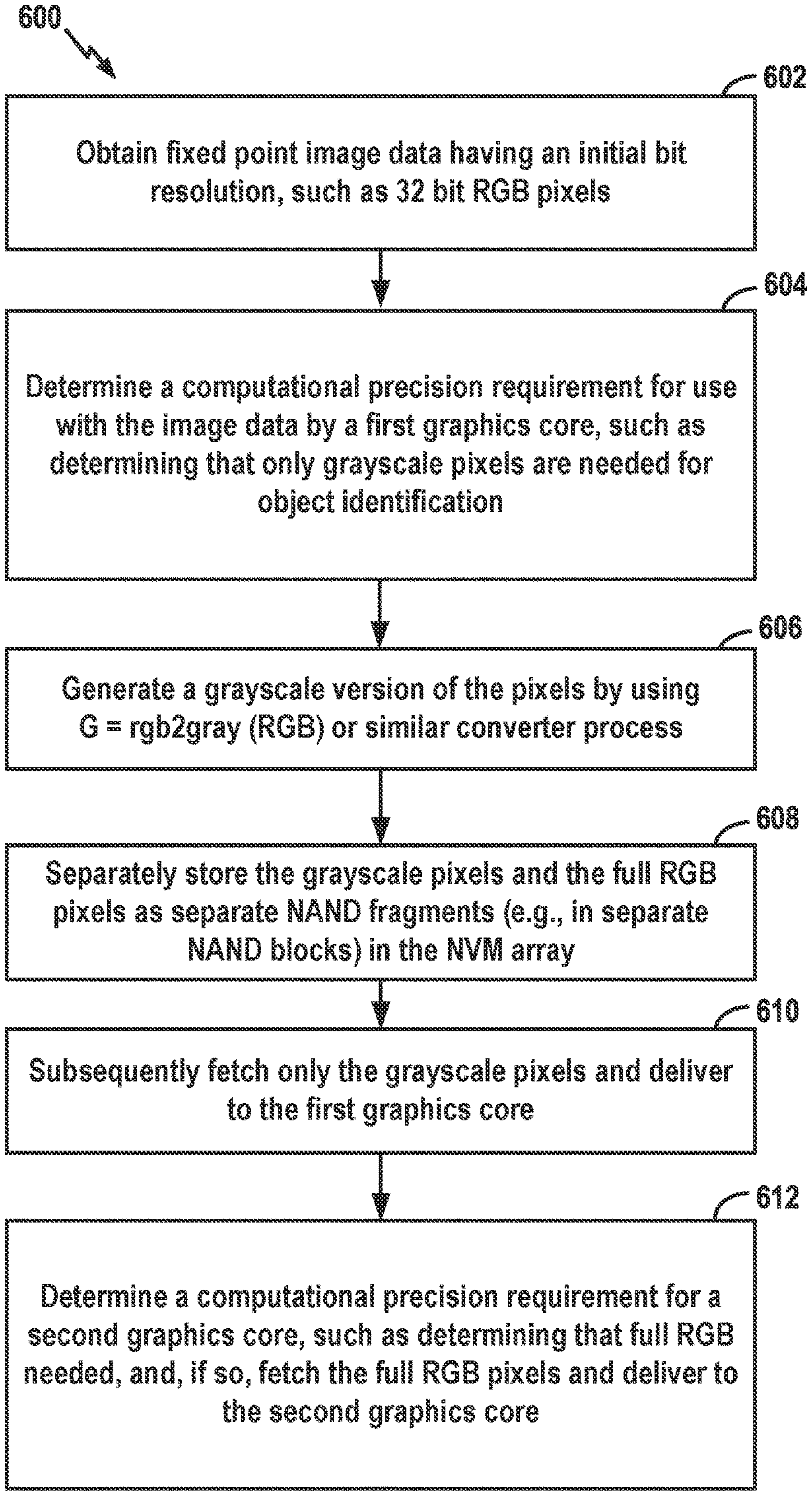
FIG. 6 is a flow chart of an exemplary method for the separate grayscale and full color grouping and storage of fixed point pixel data, according to aspects of the present disclosure.

FIG. 6 is a flow chart of exemplary method according to aspects of the present disclosure for grouping of fixed point image data, e.g., pixels, based on computational precision requirements. Beginning at block 602, a processor or controller within a CSD or other SSD, such as the controller 116 of FIG. 1, obtains fixed point image data having an initial bit resolution, such as 32 bit RGB pixels. At block 604, the processor determines a computational precision requirement for use with the image data by a first graphics core, such as determining that only grayscale pixels are needed for object identification. At block 606, the processor generates a grayscale version of the pixels by using G=rgb2gray (RGB) or a similar converter process. At block 608, the processor separately stores the grayscale pixels and the full RGB pixels as separate NAND fragments (e.g., in separate NAND blocks) in the NVM array. At block 610, the processor subsequently fetches only the grayscale pixels from the NVM array and delivers the grayscale pixels to the first graphics core. This may be done, e.g., when the graphics core requests the data to perform a graphics operation such as object identification. In some examples, as noted above, the FTL controller may control the storage of the data in the NVM array and its fetching and retrieval (including the use of caches or the like).

At block 612, the processor may then determine a computational precision requirement for a second graphics core, such as determining that full RGB needed, and, if so, the processor fetches the full RGB pixels and delivers the RGB pixels to the second graphics core to perform a different graphics operation that requires color processing. These procedures may be repeated for multiple cores and for multiple requests for data from those cores. In some cases, the computational precision requirements for a particular graphics core may be dynamic and so image data having different levels of precision (e.g., grayscale or RGB) may be delivered to the core at different times. In other examples, a particular core might only need image data of one level of precision (e.g., just grayscale) for all of its computing operations. Also, there can be different levels of precision to the RGB data, depending upon the number of different colors the RGB data encodes. That is, a plurality of copies of an image or video having different resolutions may be stored separately in the NVM array for use as needed. Note that in some examples it may be advantageous to dynamically lower the precision of the RGB data sent to a host to provide isochronous (timely) data to the host when there is insufficient bandwidth for higher precision data and then later send the higher resolution RGB data when there is sufficient bandwidth.

Exemplary Apparatus for Use with NVM Array

Figure 7:
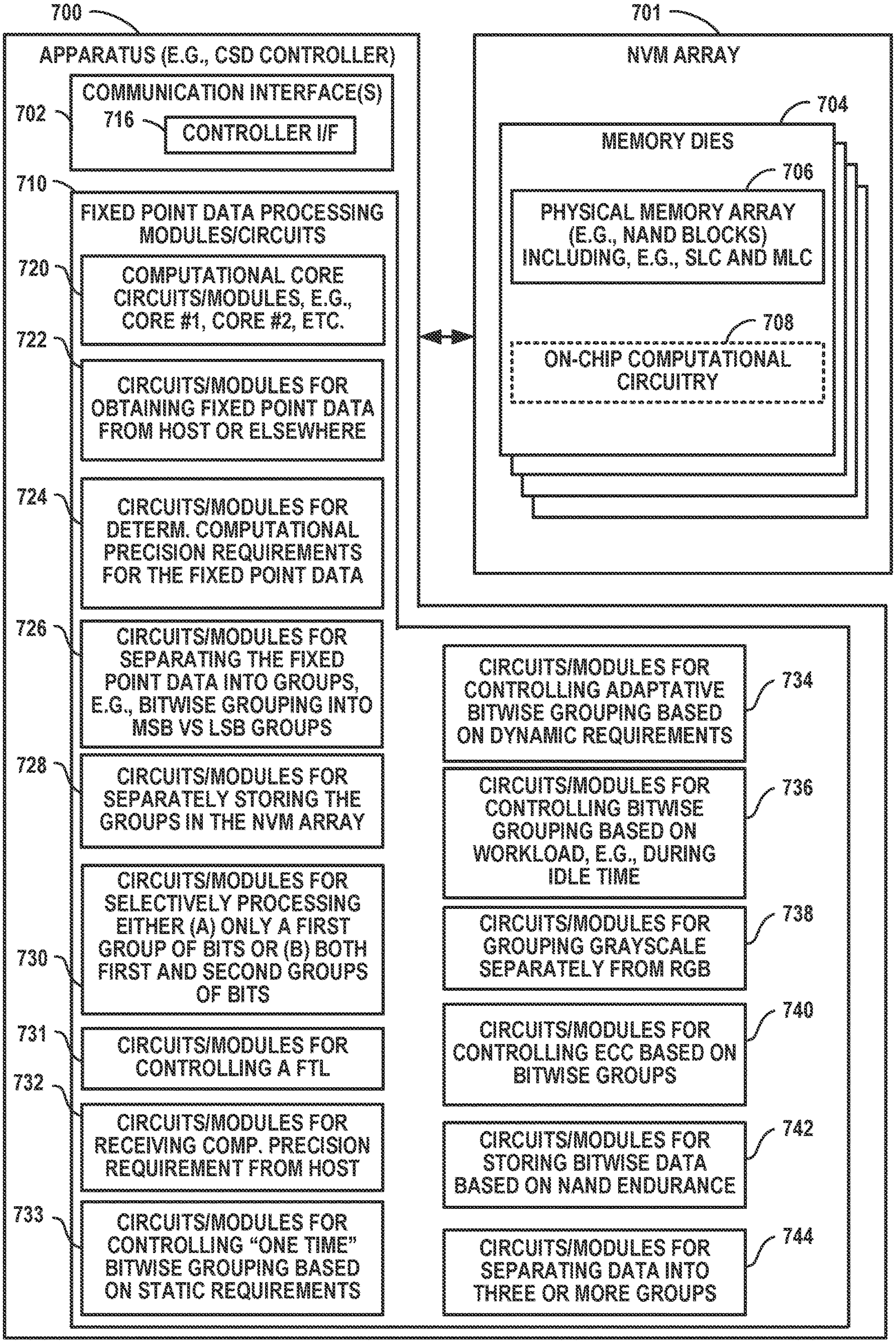
FIG. 7 is a schematic block diagram configuration for an exemplary apparatus such as a CSD configured for the separate bitwise grouping and storage of fixed point data, according to aspects of the present disclosure.

FIG. 7 illustrates an embodiment of an apparatus 700 configured according to one or more aspects of the disclosure. The apparatus 700, or components thereof, could embody or be implemented within a CSD other type of device that supports computations and data storage. In various implementations, the apparatus 700, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes, or uses data.

The apparatus 700 is communicatively coupled to an NVM array 701 that includes one or more memory dies 704, each of which may include physical memory arrays 706, e.g., NAND blocks. In some examples, the memory dies may include on-chip computational circuitry such as under-the-array circuitry. The memory dies 704 may be communicatively coupled to the apparatus 700 such that the apparatus 700 can read or sense information from, and write or program information to, the physical memory array 706. That is, the physical memory array 706 can be coupled to circuits of apparatus 700 so that the physical memory array 706 are accessible by the circuits of apparatus 700. Note that not all components of the memory dies are shown. The dies may include, e.g., latches, input/output components, etc. The connection between the apparatus 700 and the memory dies 704 of the NVM array 701 may include, for example, one or more busses.

The apparatus 700 includes a communication interface 702 and fixed point data processing modules/circuits 710, which may be components of a controller or processor of the apparatus. These components can be coupled to and/or placed in electrical communication with one another and with the NVM array 701 via suitable components, represented generally by connection lines in FIG. 7. Although not shown, other circuits such as timing sources, peripherals, voltage regulators, and power management circuits may be provided, which are well known in the art, and therefore, will not be described any further.

The communication interface 702 provides a means for communicating with other apparatuses over a transmission medium. In some implementations, the communication interface 702 includes circuitry and/or programming (e.g., a program) adapted to facilitate the communication of information bi-directionally with respect to one or more devices in a system. In some implementations, the communication interface 702 may be configured for wire-based communication. For example, the communication interface 702 could be a bus interface, a send/receive interface, or some other type of signal interface including circuitry for outputting and/or obtaining signals (e.g., outputting signal from and/or receiving signals into an SSD). The communication interface 702 serves as one example of a means for receiving and/or a means for transmitting.

The modules/circuits 710 are arranged or configured to obtain, process and/or send data, control data access and storage, issue or respond to commands, and control other desired operations. For example, the modules/circuits 710 may be implemented as one or more processors, one or more controllers, and/or other structures configured to perform functions. According to one or more aspects of the disclosure, the modules/circuits 710 may be adapted to perform any or all of the features, processes, functions, operations and/or routines described herein. For example, the modules/circuits 710 may be configured to perform any of the steps, functions, and/or processes described with respect to FIGS. 1-6.

As used herein, the term "adapted" in relation to the processing modules/circuits 710 may refer to the modules/circuits being one or more of configured, employed, implemented, and/or programmed to perform a particular process, function, operation and/or routine according to various features described herein. The modules/circuits may include a specialized processor, such as an application specific integrated circuit (ASIC) that serves as a means for (e.g., structure for) carrying out any one of the operations described in conjunction with FIGS. 1-6. The modules/circuits serve as an example of a means for processing. In various implementations, the modules/circuits may provide and/or incorporate, at least in part, functionality described above for the components in various embodiments shown, including for example component 116 of FIG. 1.

According to at least one example of the apparatus 700, the processing modules/circuits 710 may include one or more of: computational core circuit/modules 720 configured for performing computations using at least some fixed point data, such as DSP, MAC computations, etc.; circuits/modules 722 configured for obtaining fixed point processing from a host or other source; circuits/modules 724 configured for determining computational precision requirements for the fixed point data, e.g., by receiving the requirements from a host or from the computational core circuit/modules 720; circuits/modules 726 configured for separating the fixed point data into groups, e.g., performing bitwise grouping based on the computational precision requirement, into first and second group of bits wherein at least one of the groups is a degraded version of the fixed point data; circuits/modules 728 configured for separately storing the groups in the NVM array 701, such as with SLC NAND blocks devoted to MSB and MLC blocks devoted to LSB; circuits/modules 730 configured for selectively processing either (a) only a first group of bits (e.g., MSB) or (b) both first and second groups of bits (e.g., MSB+LSB); circuits/modules 731 configured for controlling an FTL; circuits/modules 732 configured for receiving a computational precision requirement from a host, e.g., within commands or hints; circuits/modules 733 configured for controlling "one time" bitwise grouping based on static computational precision requirements: circuits/modules 734 configured for controlling adaptive bitwise grouping based on dynamic computational precision requirements, including performing the separation of the fixed point data into bitwise groups a plurality of times based on a dynamic computational precision requirement; circuits/modules 736 configured for controlling bitwise grouping based on workload, e.g., performing the group during idle time or garbage collection time; circuits/modules 738 configured for generating and grouping grayscale data separately from RGB data; circuits/nodules 740 configured for controlling ECC based on bitwise groups by, for example, applying a first number of ECC parity bits to a first group of bits (e.g., MSB) and applying a second, different number of ECC parity bits to the second group of bits (e.g., LSB bits); circuits/modules 742 configured for storing bitwise data in the NVM array based on NAND endurance, e.g., storing MSB data in blocks that offer greater endurance and storing LSB in blocks with less expected endurance; circuits/modules 744 configured for separating data into three or more groups, e.g., to separate one or both of the first group of bits and the second group of bits into additional groups of bits representative of different levels of precision of the fixed point data.

In at least some examples, means may be provided for performing the functions illustrated in FIG. 7 and/or other functions illustrated or described herein. For example, the means may include one or more of: means, such as computational core circuit/modules 720, for performing computations using at least some fixed point data, such as DSP, MAC computations, etc.; means, such as circuits/modules 722, for obtaining fixed point processing from a host or other source; means, such as circuits/modules 724, for determining computational precision requirements for the fixed point data, e.g., by receiving the requirements from a host or from the computational core circuit/modules 720: means, such as circuits/modules 726, for separating the fixed point data into groups, e.g., performing bitwise grouping based on the computational precision requirement, into first and second group of bits wherein at least one of the groups is a degraded version of the fixed point data; means, such as circuits/modules 728, for separately storing the groups in the NVM array 704, such as with SLC NAND blocks devoted MSB and MLC blocks devoted to LSB; means, such as circuits/modules 730, for selectively processing either (a) only a first group of bits (e.g., MSB) or (b) both first and second groups of bits (e.g., MSB+LSB); means, such as circuits/modules 731, for controlling an FTL; means, such as circuits/modules 732, for receiving a computational precision requirement from a host, e.g., within commands or hints.

Still further, the means may include one or more of: means, such as circuits/modules 733, for controlling "one time" bitwise grouping based on static computational precision requirements; means, such as circuits/modules 734, for controlling adaptive bitwise grouping based on dynamic computational precision requirements, including performing the separation of the fixed point data into bitwise groups a plurality of times based on a dynamic computational precision requirement; means, such as circuits/modules 736, for controlling bitwise grouping based on workload, e.g., performing the group during idle time or garbage collection time; means, such as circuits/modules 738, for generating and grouping grayscale data separately from RGB data; means, such as circuits/modules 740, for controlling ECC based on bitwise groups by, for example, applying a first number of FCC parity bits to a first group of bits (e.g., MSB) and applying a second, different number of ECC parity bits to the second group of bits (e.g., LSB bits); means, such as circuits/modules 742, for storing bitwise data in the NVM array based on NAND endurance, e.g., storing MSB data in blocks that offer greater endurance and storing LSB in blocks with less expected endurance; means, such as circuits/modules 744, for separating data into three or more groups, e.g., to separate one or both of the first group of bits and the second group of bits into additional groups of bits representative of different levels of precision of the fixed point data.

In yet another aspect of the disclosure, a non-transitory computer-readable medium is provided that has one or more instructions which when executed by a processing circuit in a CSD or DSD controller causes the controller to perform one or more of the functions or operations listed above.

Additional Exemplary Methods and Embodiments

Figure 8:
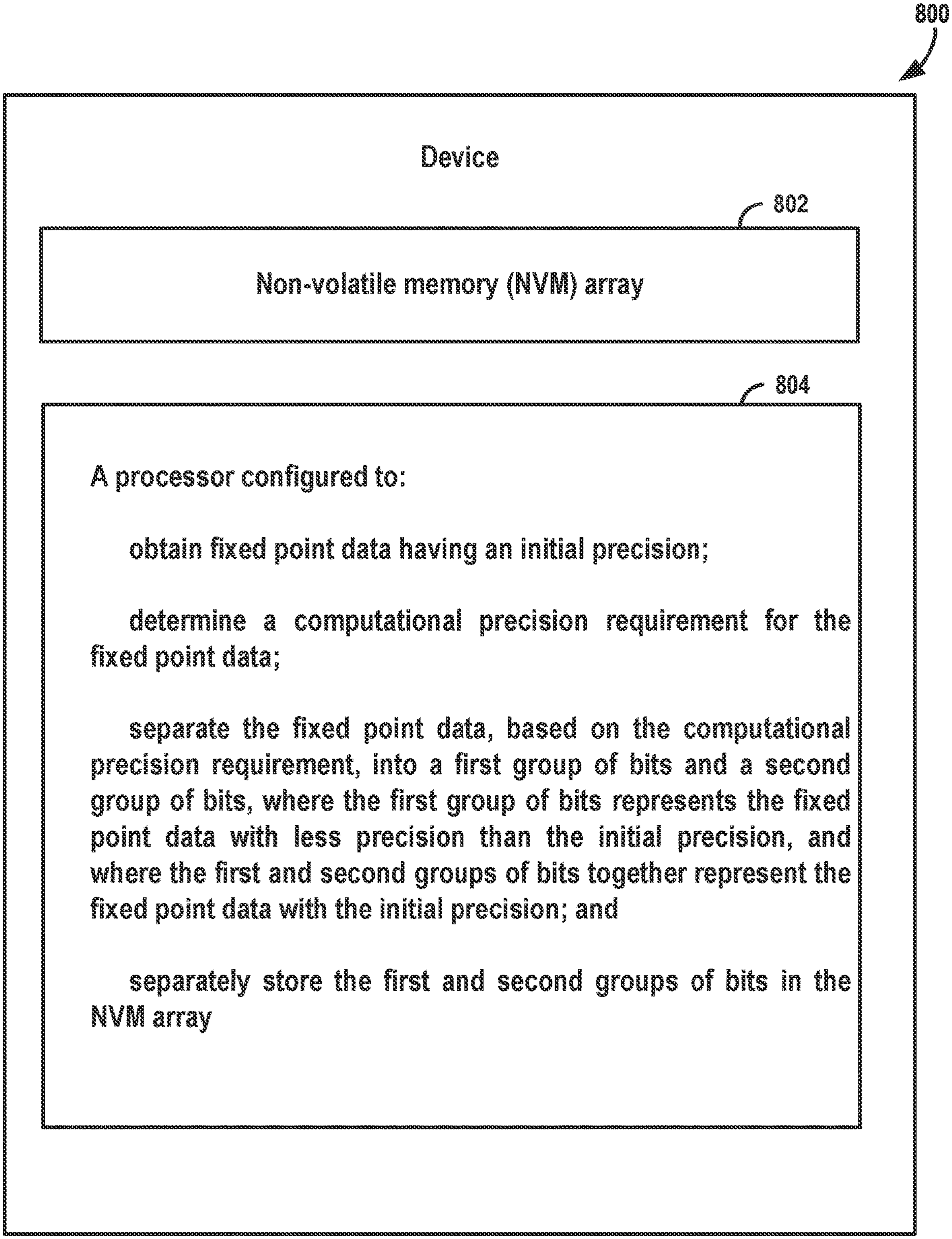
FIG. 8 is a schematic block diagram configuration for another exemplary apparatus such as a CSD configured for the separate bitwise grouping and storage of fixed point data, according to aspects of the present disclosure.

FIG. 8 is a block diagram of a device 800 in accordance with some aspects of the disclosure. The device 800 (which may be a CSD or other SSD or DSD) includes an NVM array 802 formed on a die. The device 800 also includes a processing circuit or processor 804 formed either on the die or within a separate controller and configured to: obtain fixed point data having an initial precision, e.g., 32 bits per word; determine a computational precision requirement for the fixed point data, e.g., 16 bits per word or 32 bits per word; separate the fixed point data, based on the computational precision requirement, into a first group of bits and a second group of bits, where the first group of bits represents the fixed point data with less precision (e.g., 16 bits per word) than the initial precision, and where the first and second groups of bits together represent the fixed point data with the initial precision (e.g., 32 bits per word); and separately store the first and second groups of bits in the NVM array. See, for example, the devices of FIGS. 1,2, 4, and 7 described above.

Figure 9:
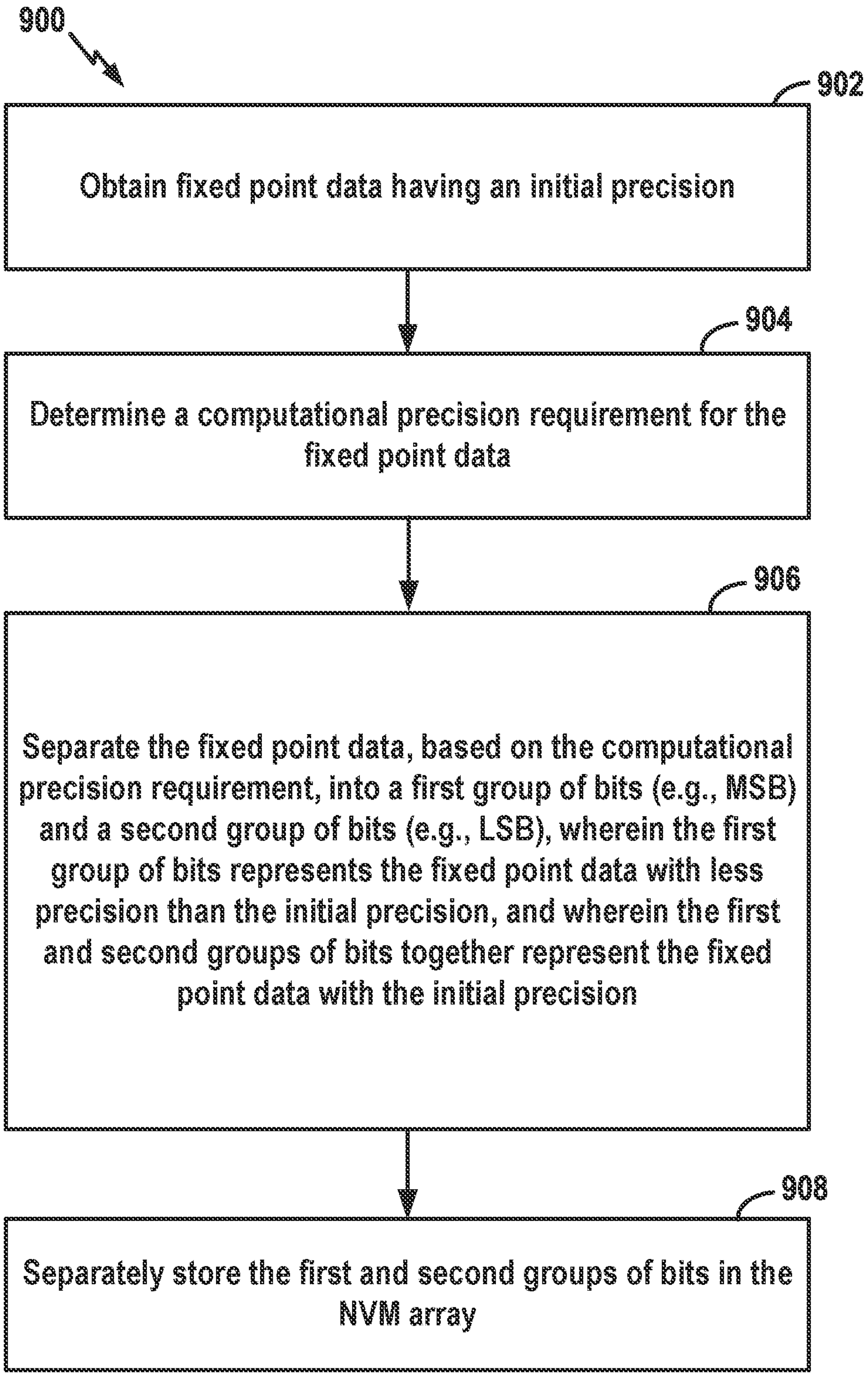
FIG. 9 is a flow chart of another exemplary method for the separate grayscale and full color grouping and storage of fixed point pixel data, according to aspects of the present disclosure.

FIG. 9 illustrates a method or process 900 in accordance with some aspects of the disclosure. The process 900 may take place within any suitable device (e.g., a CSD or other SSD or DSD) or apparatus capable of performing the operations, such as the SoC of a data storage controller or an extra-array circuit formed on an NVM die. See, for example, the devices of FIGS. 1, 2, 4, and 7, described above. At block 902, the device obtains fixed point data having an initial precision. e.g., 32 bits per word. The data may be, e.g., received from a host or, in some cases, the data might be generated by a component of the device or read out of the NVM array (if already stored in the NVM array). At block 904, the device determines a computational precision requirement for the fixed point data, e.g., 16 bits per word or 32 bits per word. At block 906, the device separates the fixed point data, based on the computational precision requirement, into a first group of bits and a second group of bits, where the first group of bits represents the fixed point data with less precision (e.g., 16 bits per word) than the initial precision, and where the first and second groups of bits together represent the fixed point data with the initial precision (e.g., 32 bits per word). At block 908, the device separately stores the first and second groups of bits in the NVM array. See, for example, the methods of FIGS. 5 and 6 described above. These procedures of FIG. 9 may be repeated. In some cases, the computational precision requirements may be dynamic and so data having different levels of precision (e.g., MSB vs. MSB+LSB or grayscale vs. RGB) may be processed at different times. In other examples, only one level of precision (e.g., just MSB or just grayscale) is used for all computing operations.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. See, also, 31) XPoint (3DXP)) memories. Each type of memory device may have different configurations. For example, flash memory devices may be configured in a NAND or a NOR configuration.

Regarding the application of the features described herein to other memories besides NAND: NOR, 3DXP, PCM, and ReRAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone. B alone, or A and B together. As another example, "A, B and/or C" is intended to cover A alone, B alone, C alone, A and B together, A and C together, B and C together, or A. B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A device, comprising:

a non-volatile memory (NVM) array; and one or more processors configured to:

obtain fixed point data having an initial precision;

determine a computational precision requirement for the fixed point data;

separate the fixed point data, based on the computational precision requirement, into a first group of bits and a second group of bits, wherein the first group of bits represents the fixed point data with less precision than the initial precision, and wherein the first and second groups of bits together represent the fixed point data with the initial precision;

separately store the first and second groups of bits in the NVM array; and selectively process either (a) both the first and second groups of bits or (b) only the first group of bits, depending upon the computational precision requirement.

2. The device of claim 1, wherein the one or more processors are further configured to separate the fixed point data into the first and second groups of bits by performing a bitwise grouping of the fixed point data.

3. The device of claim 2, wherein the first group of bits comprises the most significant bits (MSB) of the fixed point data and wherein the second group of bits comprises the least significant bits (LSB) of the fixed point data.

4. The device of claim 1, wherein the one or more processors are further configured to store the first group of bits as a first data fragment in the NVM array and to store the second group of bits as a second data fragment in the NVM array.

5. The device of claim 1, wherein the fixed point data comprises one or more of audio data, video data, image data, or computational kernel weights.

6. The device of claim 1, wherein the one or more processors further comprise a decision component configured to determine whether to process (a) both the first and second groups of bits or (b) only the first group of bits.

7. The device of claim 1, wherein the NVM array comprises at least one die and wherein the processor is formed on the at least one die.

8. The device of claim 7, wherein the at least one die is configured as a complementary metal-oxide-semiconductor (CMOS) directly bonded to array (CBA) die.

9. The device of claim 1, wherein the one or more processors are components of a data storage controller that is separate from the NVM array.

10. The device of claim 1, wherein the one or more processors further comprise a flash translation layer (FTL) controller, and wherein the FTL controller is configured to perform the separation of the fixed point data into the first and second groups of bits and to control the separate storage of the first and second groups of bits in the NVM array.

11. The device of claim 1, wherein the computational precision requirement is either (a) regular precision processing or (b) low precision processing that uses lower precision than the regular precision processing.

12. The device of claim 1, wherein the one or more processors further comprise one or more computational cores that are configured to provide the computational precision requirement.

13. The device of claim 1, wherein the one or more processors are further configured to obtain the computational precision requirement from a host device.

14. The device of claim 1, wherein the one or more processors are further configured to perform the separation of the fixed point data once based on a static computational precision requirement.

15. The device of claim 1, wherein the one or more processors are further configured to perform the separation of the fixed point data a plurality of times based on a dynamic computational precision requirement.

16. The device of claim 1, wherein the one or more processors are further configured to perform the separation of the fixed point data during selected periods of time based on a workload of the device.

17. The device of claim 16, wherein the one or more processors are further configured to perform the separation of the fixed point data during an idle time or a garbage collection time of the device.

18. The device of claim 1, wherein the fixed point data comprises a pixel of an image, wherein the first group of bits comprises grayscale components of the pixel, and wherein the second group of bits comprises color components of the pixel.

19. The device of claim 1, wherein the one or more processors are further configured to apply a first number of error correction coding (ECC) bits to the first group of bits and apply a second number of ECC bits to the second group of bits, where the second number of ECC bits is different from the first number of ECC bits.

20. The device of claim 1, wherein the one or more processors are further configured to store the first group of bits in a first portion of the NVM array having a first level of endurance and to store the second group of bits in a second portion of the NVM array having a second level of endurance, where the second level of endurance is different from the first level of endurance.

21. The device of claim 1, wherein the one or more processors are further configured to separate one or both of the first group of bits and the second group of bits into additional groups of bits representative of different levels of precision of the fixed point data to provide three or more groups of bits.

22. The device of claim 1, wherein the device comprises a computational storage device (CSD).

23. A method for use by a device comprising a non-volatile memory (NVM) array, the method comprising;

obtaining fixed point data having an initial precision;

determining a computational precision requirement for the fixed point data;

separating the fixed point data, based on the computational precision requirement, into a first group of bits and a second group of bits, wherein the first group of bits represents the fixed point data with less precision than the initial precision, and wherein the first and second groups of bits together represent the fixed point data with the initial precision; and separately storing the first and second groups of bits in the NVM array; and selectively processing either (a) both the first and second groups of bits or (b) only the first group of bits, depending upon the computational precision requirement.

24. An apparatus for use with a non-volatile memory (NVM) array, the apparatus comprising;

means for obtaining fixed point data having an initial precision;

means for determining a computational precision requirement for the fixed point data;

means for separating the fixed point data, based on the computational precision requirement, into a first group of bits and a second group of bits, wherein the first group of bits represents the fixed point data with less precision than the initial precision, and wherein the first and second groups of bits together represent the fixed point data with the initial precision; and means for separately storing the first group of bits and the second group of bits in the NVM array; and means for selectively processing either (a) both the first and second groups of bits or (b) only the first group of bits, depending upon the computational precision requirement.

25. A device, comprising:
a non-volatile memory (NVM) array; and
one or more processors configured to:
obtain fixed point data having an initial precision, wherein the fixed point data comprises a pixel of an image;
determine a computational precision requirement for the fixed point data;
separate the fixed point data, based on the computational precision requirement, into a first group of bits and a second group of bits, wherein the first group of bits represents the fixed point data with less precision than the initial precision, wherein the first and second groups of bits together represent the fixed point data with the initial precision, and wherein the first group of bits comprises grayscale components of the pixel and the second group of bits comprises color components of the pixel; and
separately store the first and second groups of bits in the NVM array.

26. A method for use by a device comprising a non-volatile memory (NVM) array, the method comprising;
obtaining fixed point data having an initial precision, wherein the fixed point data comprises a pixel of an image;
determining a computational precision requirement for the fixed point data;
separating the fixed point data, based on the computational precision requirement, into a first group of bits and a second group of bits, wherein the first group of bits represents the fixed point data with less precision than the initial precision, wherein the first and second groups of bits together represent the fixed point data with the initial precision, and wherein the first group of bits comprises grayscale components of the pixel and the second group of bits comprises color components of the pixel; and
separately storing the first and second groups of bits in the NVM array.

27. A device, comprising:
a non-volatile memory (NVM) array; and
one or more processors configured to:
obtain fixed point data having an initial precision;
determine a computational precision requirement for the fixed point data;
separate the fixed point data, based on the computational precision requirement, into a first group of bits and a second group of bits, wherein the first group of bits represents the fixed point data with less precision than the initial precision, and wherein the first and second groups of bits together represent the fixed point data with the initial precision;
apply a first number of error correction coding (ECC) bits to the first group of bits and apply a second number of ECC bits to the second group of bits, where the second number of ECC bits is different from the first number of ECC bits; and
separately store the first and second groups of bits in the NVM array.

28. A method for use by a device comprising a non-volatile memory (NVM) array, the method comprising;
obtaining fixed point data having an initial precision;
determining a computational precision requirement for the fixed point data;
separating the fixed point data, based on the computational precision requirement, into a first group of bits and a second group of bits, wherein the first group of bits represents the fixed point data with less precision than the initial precision, and wherein the first and second groups of bits together represent the fixed point data with the initial precision;
applying a first number of error correction coding (ECC) bits to the first group of bits and applying a second number of ECC bits to the second group of bits, where the second number of ECC bits is different from the first number of ECC bits; and
separately storing the first and second groups of bits in the NVM array.

* * * * *